United States Patent

[11] 3,567,848

[72] Inventors Paul Hans Thies
Munich;
Rainer Bergmann, Dortmund, Germany

[21] Appl. No. 713,773
[22] Filed Mar. 18, 1968
[45] Patented Mar. 2, 1971
[73] Assignee Siemens Aktiengesellschaft
Berlin, Germany
[32] Priority Mar. 17, 1967
[33] Germany
[31] S108,885

[54] TELEPHONE-TELEVISION EQUIPMENT

16 Claims, 6 Drawing Figs.

[52] U.S. Cl. 178/6, 178/7.85, 179/2, D26/14
[51] Int. Cl. G02b 27/00, H04n 5/64, H04n 7/06
[50] Field of Search 178/5.6, 5.8, 7.82, 7.85, 7.88, 7.91; 179/2 (TV), 1 (HFT); DES26/14, 14X

[56] References Cited

UNITED STATES PATENTS

| | | | |
|---|---|---|---|
| 3,495,908 | 2/1970 | REA | 178/6.8 |
| 2,895,005 | 7/1959 | Kock | 179/2TV |
| 3,116,365 | 12/1963 | Prescott | 178/5.6 |
| 3,144,513 | 8/1964 | Sherron | 179/1HFT |
| DES 200,495 | 3/1965 | Dreyfuss | DES26/14X |

*Primary Examiner*—Richard Murray
*Assistant Examiner*—Howard W. Britton
*Attorney*—Irons, Swindler, McKie and Beckett ABSTRACT: Apparatus for use in conjunction with telephone-television equipment wherein subscribers may simultaneously communicate acoustically and visually. At each subscriber station, the television camera is arranged in relation to the television receiver such that the user must be positioned within viewing range of the television camera to observe the image reproduced by the television receiver. This insures automatic transmission of a television signal to the associated connected subscriber which represents the image of the user.

TELEPHONE-TELEVISION EQUIPMENT

BACKGROUND OF THE INVENTION

1. Field of the Invention

The invention relates to telephone-television apparatus wherein connected subscribers receive visual as well as acoustic signals. Thus the image of the user, as well as his voice communication, is transmitted to the connected subscriber. The invention is particularly directed to a housing for the telephone-television apparatus which conveniently houses the necessary equipment in a compact and efficient manner, and simultaneously guides the user to a position to observe the image reproduced by the picture tube, and to be viewed by the camera tube.

2. Description of the Prior Art

The use of telephone-television equipment is known in the prior art. However, this normally necessitates that a subscriber utilize a conventional telephone handset for voice communication and position himself before a television camera so that his visual image may be transmitted to the associated connected subscriber. A television receiver is also provided for receipt of television signals from the associated subscriber. A slight movement or change in position of the subscriber may place him outside the viewing range of the television camera with the subsequent result that the associated subscriber will not receive a television picture of the subscriber.

This problem is compounded by the fact that television cameras must be supported substantially rigidly. Although automatic guides may be employed to change the position of the television camera in relation to a change in position of a subscriber, these are normally prohibitively expensive.

Other known telephone-television systems employ a mirror arranged next to or below the television camera in such a position that an indication is given to the subscriber that he is within viewing range of the television camera when he can recognize his own image in the mirror. However, this requires that the subscriber look in a direction other than directly into the television camera with the result that a television picture is transmitted to the associated subscriber that is not an absolute head-on view of the subscriber. This type of equipment is therefore undesirable because television receivers for use with telephone equipment normally employ small screens, and, therefore, an unsatisfactory image of the subscriber is transmitted.

SUMMARY OF THE INVENTION

These and other defects of prior art telephone-television apparatus are solved by the present invention which enables the subscriber to observe the received television picture only when he is within viewing range of the television camera. This enables the subscriber to concentrate his eyes on the image of the associated subscriber reproduced by the television receiver, since he is not required to look in a direction other than that of the received image in order to check whether or not he is within viewing range of the television camera. Therefore, the subscriber is automatically positioned within the viewing range of the television camera when he positions himself so as to be able to observe the received image of the associated subscriber.

A compact housing is provided for the telephone and television equipment. The housing is designed such that the television receiver and television camera are mounted vertically, and an optical arrangement is provided such that the received reproduced image is redirected into the normal horizontally oriented observation axis. An optical arrangement is also provided in conjunction with the television camera to permit the subscriber's image to be redirected to within the viewing range of a vertically mounted television camera.

Therefore the housing has its longest dimension in the vertical direction. This enables maximizing the length of the picture tube of the receiver and the neck of the television camera tube of the transmitter. This increases the effectiveness of these components.

The housing also provides for the mounting therein of loudspeakers and microphones, and therefore it is not necessary that a conventional telephone handset be utilized. A stand is provided for the housing, but it may alternatively be placed directly on a desk or table, for example. Also a conventional telephone handset may be used in conjunction with the television equipment, if desired. The invention therefore provides a compact housing which maximizes the effectiveness of the television receiver and camera utilized, and simultaneously provides a convenient and easy-to-use telephone-television apparatus for the subscriber.

DETAILED DESCRIPTION OF THE INVENTION

Figure 1:
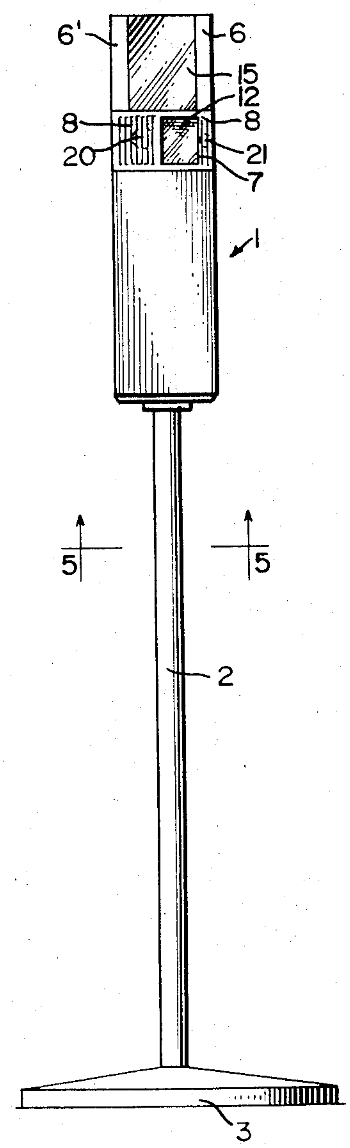
FIG. 1 is a front elevation view of the exterior portion of the television-telephone according to the invention.

FIG. 1 shows the general structure of the telephone-television comprising the invention. Housing 1 is supported by a stand comprising support base 3 and shaft 2. Housing 1 is adjustable with respect to shaft 2, thereby enabling the housing to be vertically adjusted along the shaft, depending upon the height of the particular user.

Prism 4 may consist of acrylic glass and comprises upper portion 16 of housing 1. It is shaped in the form of a rectangular block and consists of sections 17 and 17' defining interface 5 therebetween. Interface 5 has matted ends 6 and 6', its surface forming an angle of substantially 45° with the plane of the surface of screen 13 of picture tube 9, and with the vertical plane of front surface 15 of prism 4. Rays from screen 13 of picture tube 9 are totally reflected at interface 5. It is known that total reflection takes place only for light within a medium of higher optical density at a surface of contact with a medium of lower optical density. Interface 5 comprises such a surface of contact, and therefore rays striking it are totally reflected.

The interface may be formed by slicing prism 4 to slightly separate sections 17 and 17' thereof by air, in which case the glass prism would comprise a medium of higher optical density compared to air. Then, no light would pass into the air, but instead the rays would be totally reflected at the interface 5 defined by section 17 and the air. Sections 17 and 17' of prism 4 may be separated by a coating of reflective material rather than by air, interface 5 then being defined between said reflective material and section 17. In effect, interface 5 of prism 4 comprises a perfect mirror.

Figure 6:
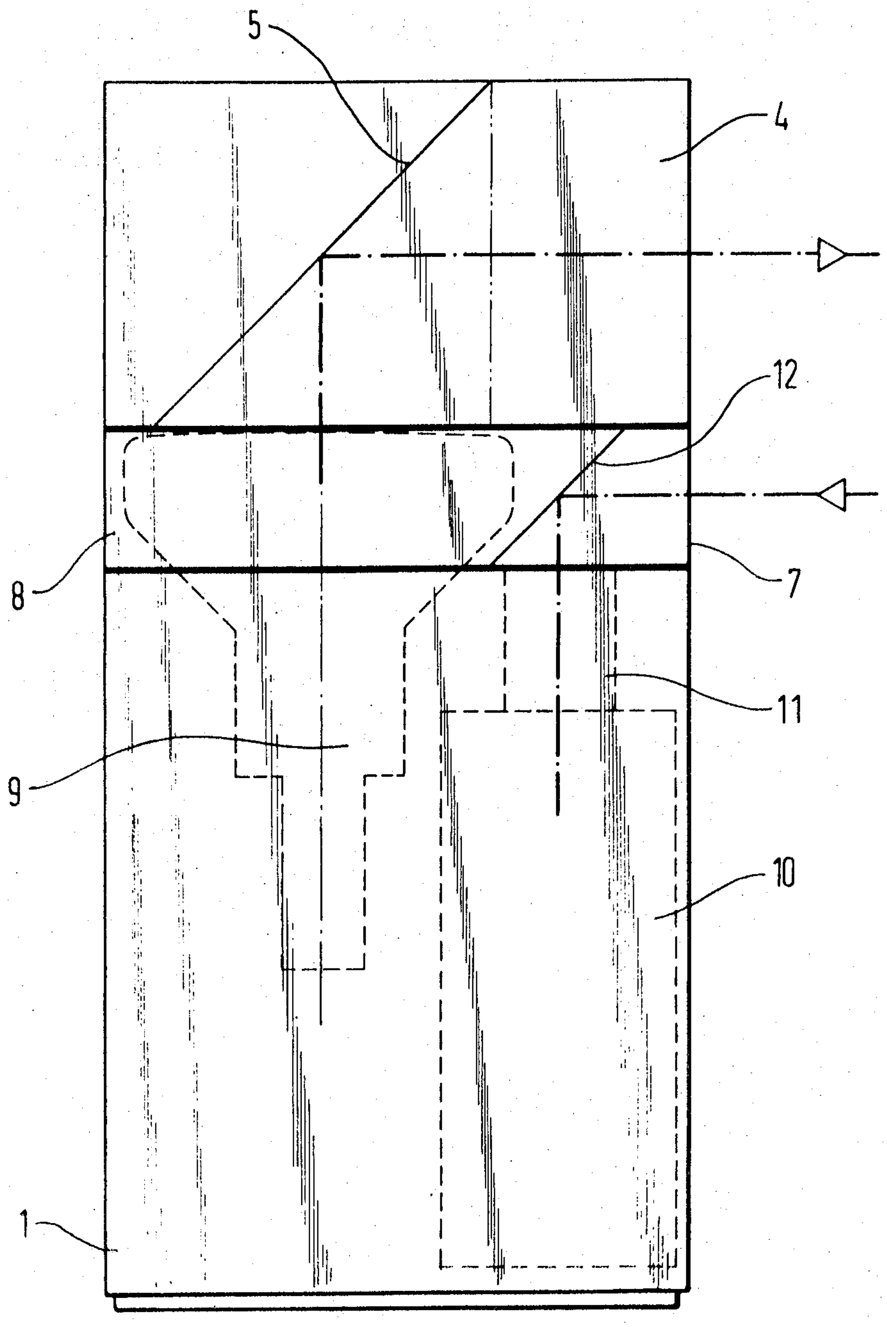
FIG. 6 is a side elevation view as viewed from the right in FIG. 1, showing details of the interior components thereof.

Thus, received television signals reproduced on screen 13 of picture tube 9 are reflected at interface 5 at an angle of 45° therefrom into a horizontal observation axis 14 that defines an angle of 90° with longitudinal axis 18 of picture tube 9. This is illustrated in FIG. 6 which shows that images reproduced on screen 13 of picture tube 9 are totally reflected at interface 5 to produce a corresponding image on front surface 15 of prism 4 in the normal horizontally oriented direction. Imaginary vertical line 19 drawn between the top surface of interface 5 and a plane substantially parallel to the surface of screen 13 thus forms an angle of 90° with the latter. Front surface 15 of glass prism 4 is substantially parallel to imaginary line 16.

It is particularly advantageous to provide interface 5 within prism 4 because the sides of the latter deflect a considerable portion of the light waves such that the image produced at front surface 15 is not recognizable from an offside position therefrom. The angle of sight of the image produced on front surface 15 of prism 4 is restricted to a range determined by the critical angle of refraction. Thus, if the user is not directly in front of front surface 15, but is displaced to either side or above or below therefrom, the image produced at front surface 15 will not be observed or will be only partially observed depending upon the relative degree of user position displacement. Glass prism 4 thereby effectively functions as a viewing shaft producing an image that may be completely observed only from a position directly opposite its front surface.

Interface 5 is dimensioned such that the entire image reproduced on screen 13 is reflected to front surface 15 of glass prism 4. Therefore, use of the optical system described comprising prism 4 having interface 5 enables vertical mounting of picture tube 9 and reflection of the image produced on screen 13 for reproduction on front surface 15 of prism 4. It therefore provides picture observation axis 14 that is oriented substantially in the normal horizontal direction. Conventional support means (not shown) may be provided to support picture tube 9 within housing 1. Therefore the use of the described optical system comprising prism 4 provides the advantages of a viewing shaft, and in addition, glass prism 4 provides an attractive smooth surface.

As shown in FIGS. 1 and 6, housing 1 defines opening 7 in the front surface thereof, directly below prism 4. Television camera tube 10 is arranged with its longitudinal axis 19 also oriented in the vertical direction, substantially parallel to longitudinal axis 18 of picture tube 9. Reflector 12 which comprises a substantially perfect mirror is supported within housing 1 by conventional means (not shown) between prism 4 and the front surface of optical system 11 of camera tube 10. It forms an angle of substantially 45° with the plane of the front surface of optical system 11 and the plane of the front surface of housing 1. Therefore rays corresponding to the image of an object positioned directly in front of opening 7 are totally reflected by reflector 12 into optical system 11 of the camera tube. Thus, objects along viewing axis 17 are in such a position that the image thereof is reflected by reflector 12 into the camera tube along longitudinal axis 23 as shown in FIG. 6. Therefore, the described optical system comprising opening 7, reflector 12, and camera tube 10 enables vertical positioning of the latter within housing 1, while simultaneously allowing camera tube 10 to respond to objects oriented in the normal horizontal viewing direction. The described optical system therefore reflects horizontally oriented objects into the longitudinally oriented viewing range of camera tube 10. Conventional means (not shown) are provided to support the camera tube within housing 1.

Figure 2:
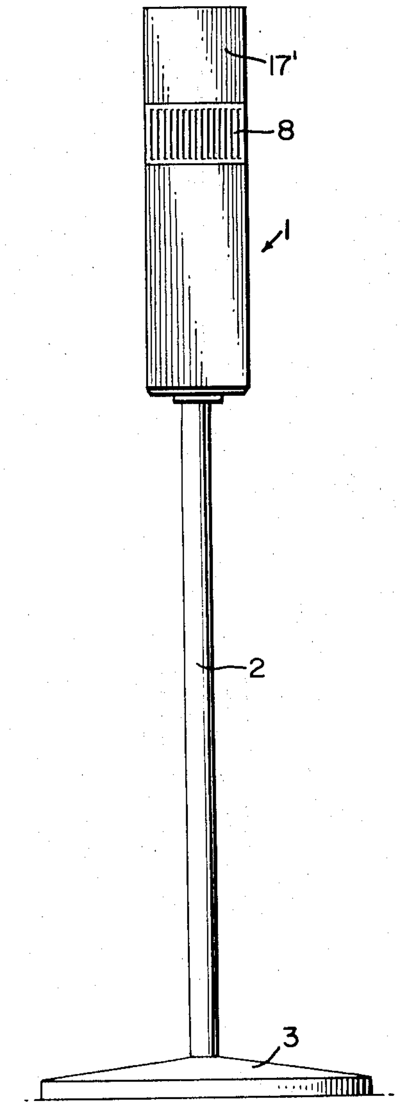
FIG. 2 is a rear elevation view of the exterior portion thereof.
Figure 3:
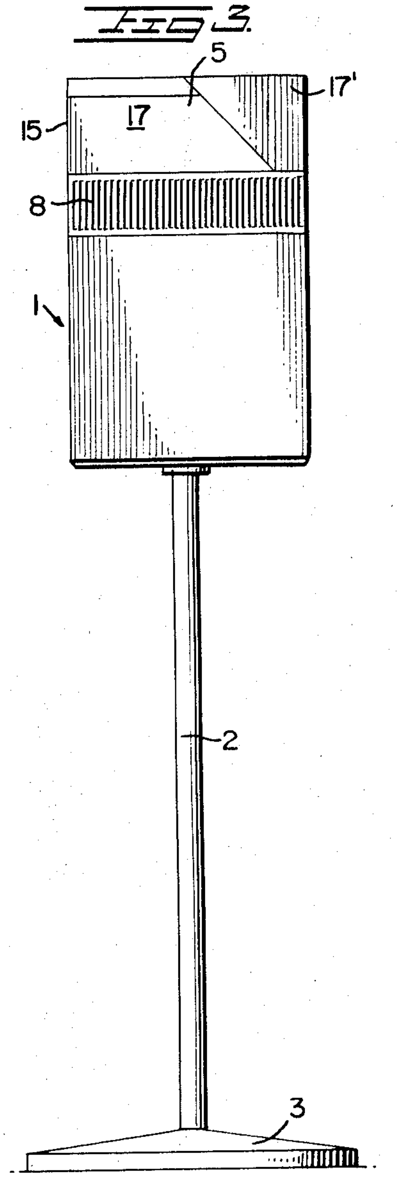
FIG. 3 is a side elevation view of the exterior portion as viewed from the left in FIG. 1.
Figure 4:
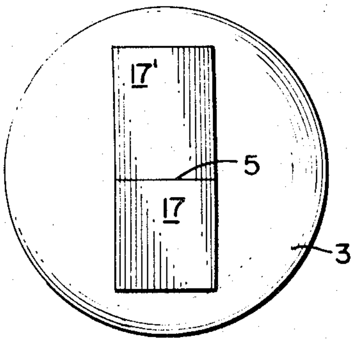
FIG. 4 is a top plan view of the exterior portion thereof.

Housing 1 further defines slits 8 arranged on both sides of opening 7 (FIG. 1), and, as shown in FIGS. 2 and 3, around the sides and back of housing 1. Loudspeakers and microphones may be mounted behind slits 8, beneath prism 4, to replace the conventional telephone handset. Either a single microphone and loudspeaker, or a plurality of microphones and loudspeakers, may be provided behind slits 8. Alternatively, a conventional handset may be used in conjunction with the telephone-television equipment disclosed.

FIG. 1 shows the positioning of loudspeaker 20 and microphone 19 behind the slits as shown by the partially broken slit sections adjacent opening 7. Conventional means (not shown) may be used to mount the loudspeaker and microphone within housing 1.

Figure 5:
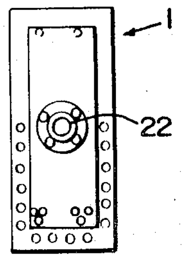
FIG. 5 is a cross-sectional view of the bottom thereof taken along section lines 5.5 of FIG. 1.

FIG. 5 shows a possible adjustment mounting means by which housing 1 may be vertically adjusted on shaft 2. Conventional bolts threaded through sleeve 22 may be used to secure housing 1 to shaft 2. Other equivalent mounting means may, of course, be substituted therefor. Further, if desired, housing 1 may be completely removed from the stand, and may be placed directly on a table for use. Appropriate ventilation and mounting holes for the various components may be provided in the base of housing 1. Therefore, it is seen that the invention is adaptable for use in a plurality of locations.

The use of glass prism 4 is particularly desirable because it is easy to construct, particularly since only interface 5 need be contained therein. The advantages of utilizing prism 4 were discussed above. Further, it enhances the essentially columnar shape of housing 1.

Observation axis 14 and viewing axis 17 are relatively positioned so that observation of the received reproduced image by the subscriber is predicated on his being positioned with respect to opening 7, such that his image is reflected to camera tube 10 by reflector 12. Thus, the arrangement restricts the range of observation of the received reproduced image to the viewing range of the camera tube, and therefore insures that the subscriber will automatically position himself within the viewing range of the camera tube since he will desire to see the received picture.

Numerous modifications and adaptations of the system of the invention will be apparent to those skilled in the art, and thus it is intended by the appended claims to cover all such modifications and adaptations as fall within the true spirit and scope of the invention.

We claim:

1. Television-telephone apparatus including television receiving equipment having a picture tube (9) with an associated screen (13) and television transmitter equipment having a camera tube (10) comprising:

a casing (1), the picture (9) and camera (10) tubes being positioned therein; and means restricting the range of observation of the received reproduced image to the viewing range of the camera tube.

2. The television-telephone apparatus recited in claim 1 wherein the longitudinal axes of the picture (18) and camera (23) tubes are similarly oriented.

3. The television-telephone apparatus recited in claim 1 wherein the longitudinal axes (18, 23) of the picture (18) and camera (23) tubes are substantially parallel and further comprising reflecting means (4) angularly relates to the longitudinal axes of both the picture (18) and camera (23) tubes to permit observation of the received reproduced image along an observation axis (14) restricted to be substantially parallel to the viewing axis (17) of images to be transmitted.

4. The television-telephone apparatus recited in claim 1 further comprising at least one loudspeaker (20) positioned therein to reproduce received telephone signals.

5. The television-telephone apparatus recited in claim 4 further comprising a microphone (21) positioned therein to transmit telephone signals.

6. The television-telephone apparatus recited in claim 1 wherein the picture (9) and camera (10) tubes are similarly oriented along substantially parallel axes (18, 23).

7. The television-telephone apparatus recited in claim 6 further comprising reflecting means angularly related to the longitudinal axes (18, 23) of both the picture (9) and camera (10) tubes to respectively define angularly related observation (14) and viewing (17) axes positioned to reflect a picture reproduced on the picture tube screen (13) along the observation axis (14) and to reflect an image of a body situated along the viewing axis (17) to the camera tube (10).

8. The television-telephone apparatus recited in claim 7 wherein the longitudinal axis (18) of the picture tube (9) defines an angle of substantially 90° with the observation axis (14), and the longitudinal axis (23) of the camera tube (10) defines an angle of substantially 90° with the viewing axis (17).

9. The television-telephone apparatus recited in claim 7 wherein the reflecting means comprise a prism (4) defining an interface (5) angularly positioned with respect to the longitudinal axis (18) of the picture tube (9) and the observation axis (14) to reflect images produced on the screen (13) of the picture tube (9) onto a surface (15) of the prism (4) along the observation axis (14).

10. The television-telephone apparatus recited in claim 9 wherein the plane of the interface (5) defines angles of substantially 45° with both the longitudinal axis (18) of picture tube (9) and the observation axis (14).

11. The television-telephone apparatus recited in claim 10, the reflecting means further comprising reflector means (12) angularly positioned with respect to the camera tube (10) to reflect an image of a body situated along the viewing axis (17)

into the camera tube (10) along the latter's longitudinal axis (23).

12. The television-telephone apparatus recited in claim 11 wherein the reflector means (12) defines angles of substantially 45° with both the longitudinal axis (23) of the camera tube (10) and the viewing axis (17).

13. The television-telephone apparatus recited in claim 12 wherein the prism (4) is positioned directly above the reflector means (12) in the direction of the substantially parallel longitudinal axes (18, 23) of the picture (9) and camera (10) tubes.

14. The television-telephone apparatus recited in claim 13 wherein the casing (1) defines an opening (7) to enable reflection of an image of a body situated along the viewing axis (17) by the reflector means (12) to the longitudinal axis (23) of the camera tube (10).

15. The television-telephone apparatus recited in claim 14 wherein the surface of the prism (15) onto which images produced on the screen (13) of the picture tube (9) are reflected is located in substantially the same plane, directly above the opening (7).

16. The television-telephone apparatus recited in claim 15 wherein said at least one loudspeaker (20) and a microphone (21) are positioned below the prism (4), adjacent to the opening (7).